United States Patent
Tegethoff et al.

[11] Patent Number: 5,826,335
[45] Date of Patent: Oct. 27, 1998

[54] PROCESS FOR REPAIRING HEAT EXCHANGER TUBES IN TUBE APPARATUS

[75] Inventors: Helmut Tegethoff; Karl Struberg; Paul Czeslik, all of Oberhausen, Germany

[73] Assignee: MAN Gutehoffnungshütte Aktiengesellschaft, Oberhausen, Germany

[21] Appl. No.: 816,302

[22] Filed: Mar. 13, 1997

[30] Foreign Application Priority Data

Mar. 14, 1996 [DE] Germany ......................... 196 09 958.7

[51] Int. Cl.⁶ ........................................................ B23P 15/26
[52] U.S. Cl. ..................................... 29/890.031; 29/890.054
[58] Field of Search ........................ 29/890.031, 890.053, 29/890.054, 402.13, 402.16, 402.07, 402.08

[56] References Cited

U.S. PATENT DOCUMENTS

| | | | |
|---|---|---|---|
| 3,962,767 | 6/1976 | Byerley et al. | 29/890.031 |
| 4,633,555 | 1/1987 | Legge | 29/890.031 |
| 4,899,436 | 2/1990 | Jacquier | 29/890.031 |
| 5,408,883 | 4/1995 | Clark, Jr. et al. | 29/890.031 |

FOREIGN PATENT DOCUMENTS

| | | |
|---|---|---|
| 0 112 612 A2 | 7/1984 | European Pat. Off. . |
| 0 416 848 A1 | 3/1991 | European Pat. Off. . |
| 2 579 738 A1 | 10/1986 | France . |
| 28 32 445 A1 | 3/1980 | Germany . |
| 34 44 279 C3 | 6/1986 | Germany . |
| 35 43 226 C2 | 8/1986 | Germany . |

*Primary Examiner*—Irene Cuda
*Attorney, Agent, or Firm*—McGlew and Tuttle

[57] ABSTRACT

A process for repairing heat exchanger tubes by partial tube replacement in the inside of closed tube apparatus with at least one cylindrical tube bottom from the tube side, wherein dents observed are first straightened, and a damaged partial tube section is separated and removed. A new partial tube section is then pushed in through a hole in the tube bottom. The joining of the new partial tube to the heat exchanger tube remaining inside the heat exchanger is performed by inner tube welding by means of an inner tube welding device, which is fastened to a bracket and a drive and is introduced through the new partial tube. Tests are performed after the welding together of the partial tube and the heat exchanger tube to demonstrate the quality.

6 Claims, 5 Drawing Sheets

PROCESS FOR REPAIRING HEAT EXCHANGER TUBES IN TUBE APPARATUS

FIELD OF THE INVENTION

The present invention pertains to two processes for repairing heat exchanger tubes by the partial replacement of tubes or the insertion of partial tubes inside closed tube apparatus with at least one cylindrical tube bottom from the tube side.

BACKGROUND OF THE INVENTION

The mechanism of damage may have different causes, such as corrosion, denting or other events inside or outside the tube bottom in the tube system.

Repair replaces the installation of new tubes or the complete replacement of the apparatus and restores the function according to the new condition in an unlimited manner by using "partial tube replacement" and in a limited manner with respect to changes in the tube cross section in the case of the "insertion of partial tubes."

The process is carried out under greatly impaired visibility conditions or without visibility, so that the individual operations should be considered to be remotely operated/remote-controlled processes.

The above-mentioned tube apparatus are mainly heat exchanger tubes with a diameter of $\geq 10$ mm in diameter and a wall thickness of $\geq 0.5$ mm.

Straight tubes, hairpin tubes of other configurations are usually used for manufacture. The number of tubes corresponds to the required capacity according to the thermic design of the tube apparatus. Austenitic and ferritic steels as well as a large number of special alloys are used.

The ability of the tube system to function is checked in power plants, in the chemical industry, etc., during the inspections within the framework of continuous monitoring of the tube apparatus.

As soon as damage is recognized, the question as to the possible repair of the damage, which can be performed by repairing individual heat exchanger tubes on the spot or by complete replacement, shall be first clarified.

SUMMARY AND OBJECTS OF THE INVENTION

The object of the present invention is therefore to develop a process by which the damage detected on heat exchanger tubes can be eliminated without the tube apparatus having to be disassembled.

According to the invention, a process for repairing heat exchanger tubes by partial tube replacement in the inside of closed tube apparatus with at least one cylindrical tube bottom from the tube side is provided. The process includes straightening of dents by introducing rotating drilling tools through the tube bottom into the inside of a tube section. The partial tube section is separated by means of a rotating cutting tool in the interior of the tube section. The connecting weld seam is removed between the tube and the tube bottom by machining. The partial tube section is then pulled through the tube bottom by means of a screw tap or an extracting device after shrinking of the rolled-area. A centering on the remaining heat exchanger tube is prepared by means of a rotating milling cutter through the tube bottom. The new partial tube section is inserted through the hole in the tube bottom. The jacket side of the apparatus is filled with forming gas. The partial tube section is joined to the remaining heat exchanger tube by inner tube welding with or without an auxiliary welding rod through the tube bottom. The joint is then pressure tested. The partial tube section is joined to the tube bottom or the plating of the tube bottom. The partial tube section in the hole of the tube bottom is hydraulicly expanded. The partial tube section is rolled onto the hole of the tube bottom.

According to another aspect of the invention a process for repairing heat exchanger tubes by partial tube insertion in the interior of closed tube apparatus with at least one cylindrical tube bottom from the tube side is provided. The process includes straightening dents by introducing a rotating drilling tool through the tube bottom. A new partial tube section of a smaller diameter is inserted in the damaged area of the heat exchanger tube. The new partial tube section of smaller diameter is joined to the heat exchanger tube at both ends by inner tube welding with or without an auxiliary welding rod through the tube bottom, wherein the weld seam located in the tube is preferably prepared as a fillet weld. The partial tube section having a smaller diameter in the area of the tube bottom is hydraulically expanded. The partial tube section having a smaller diameter in the area of the tube bottom is rolled on.

The process steps according to the present invention cover each installation position of the tube apparatus (ranging from vertical to horizontal).

The repair is performed according to the present invention corresponding to the type of damage by "partial tube replacement" or by "partial tube insertion" of damaged heat exchanger tubes in the tube system of a tube apparatus.

The following steps are performed in the case of the repair of the damaged heat exchanger tubes by "partial tube replacement:"

Straightening of the dents by introducing a rotating drilling tool through the tube bottom into the interior of the tube section, separation of a partial tube section by means of a rotating cutting tool in the interior of the tube section, removal of the connecting weld seam between the tube and the tube bottom by machining, pulling the partial tube section though the tube bottom by means of a screw tap or an extracting device after shrinking the rolled area, preparation of a centering on the remaining heat exchanger tube by means of a rotating milling cutter through the tube bottom, insertion of a new partial tube section through the hole in the tube bottom, filling of the jacket side of the apparatus with forming gas, joining the partial tube section to the remaining heat exchanger tube by inner tube welding with or without auxiliary welding rod through the tube bottom, pressure test of the joint, joining the partial tube section to the tube bottom or the plating of the tube bottom, hydraulic expansion of the partial tube section in the hole of the tube bottom, rolling the partial tube section onto the hole of the tube bottom, performance of tests to evaluate the quality of the joints.

The following process steps are performed in the case of the repair of the damaged heat exchanger tube by partial tube insertion:

Straightening of the dents by introducing a rotating drilling tool through the tube bottom, insertion of a new partial tube section of a smaller diameter in the damaged area of the heat exchanger tube, joining the new partial tube section having a smaller diameter to the heat exchanger tube at both ends by inner tube welding with or without auxiliary welding rod through the tube bottom, hydraulic expansion of the partial tube section having a smaller diameter in the area of the tube bottom, rolling on of the partial tube section having the smaller diameter in the area of the tube bottom, performance of various tests to evaluate the quality of the joints.

One application of the process according to the present invention, a repair of heat exchanger tubes by a partial tube replacement, will be explained in greater detail on the basis of a schematic exemplary embodiment.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
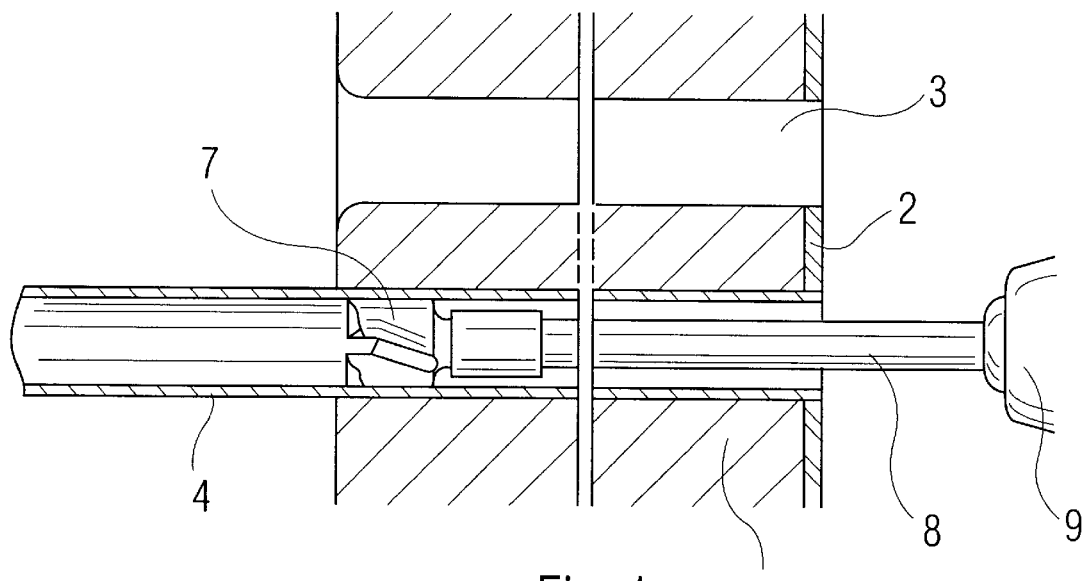
FIG. 1 is a sectional view showing the straightening of the dents.

Referring to the drawings in particular, FIG. 1 shows the first processing step of a dented heat exchanger tube 4.

By introducing a rotating drilling tool 7 with bracket 8 and drive 9, which may be, e.g., a spot facer, a heat exchanger tube 4 welded to the plating 2 in one of the holes 3 of the tube bottom 1 is freed of dents located on the inside.

Figure 2:
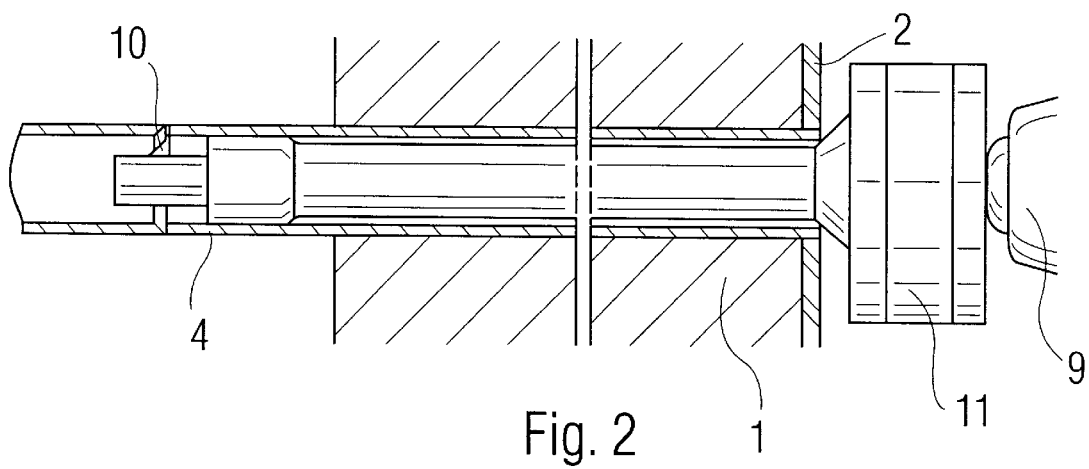
FIG. 2 is a sectional view showing the separation of a partial tube section.

According to FIG. 2, the heat exchanger tube 4 is cut through by a cutting tool 10 with drive 9 and feed mechanism 11, which tool rotates inside the tube section.

Figure 3:
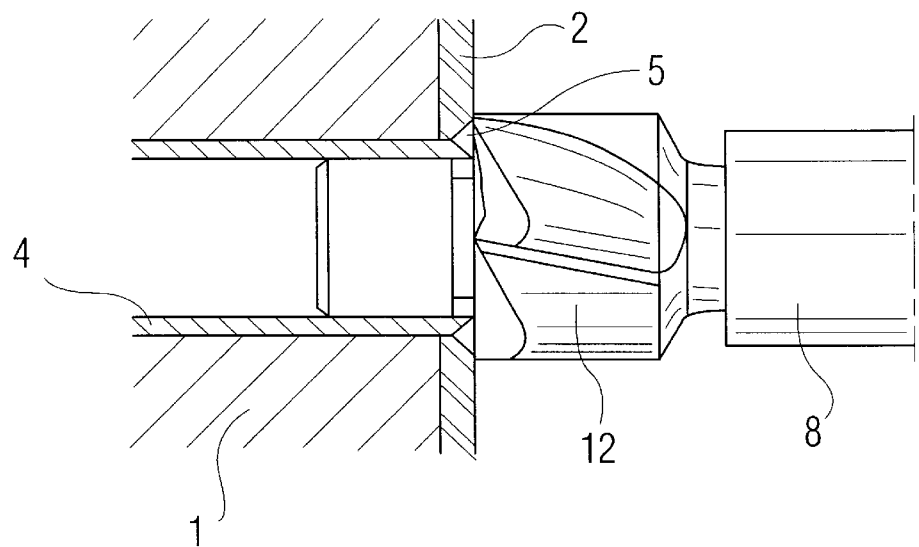
FIG. 3 is a sectional view showing removal of the connecting weld seam between tube and tube bottom.
Figure 4:
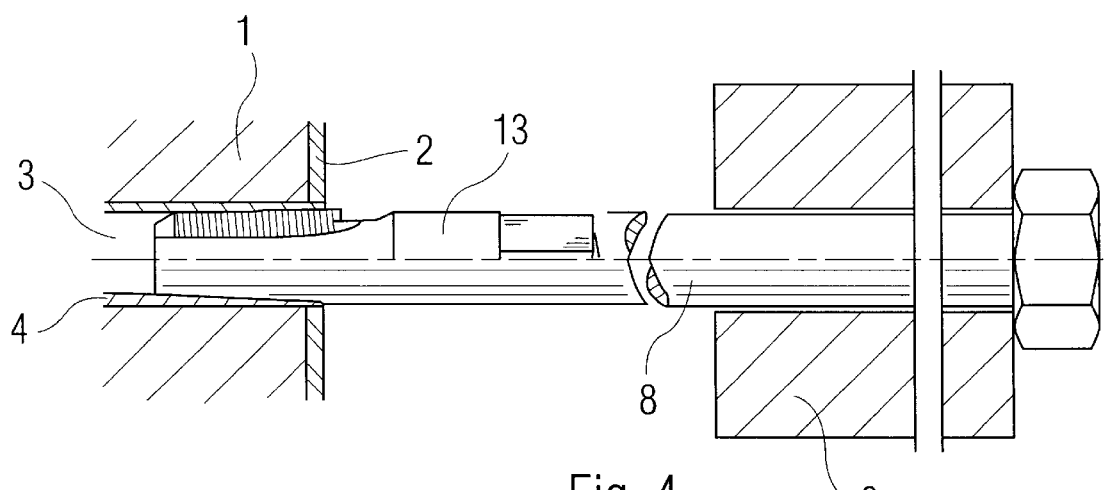
FIG. 4 is a sectional view showing pulling of the partial tube section.

According to FIG. 3, the welded seam 5 of the separated heat exchanger tube 4 at the plating 2 of the tube bottom 1 is eliminated with a milling cutter 12. The partial section of the tube 4 is pulled out of the hole 3 of the tube bottom 1 by means of an extracting device 13 with bracket 8 and drive 9 corresponding to FIG. 4 (the separated heat exchanger partial tube section is pulled out).

Figure 5:
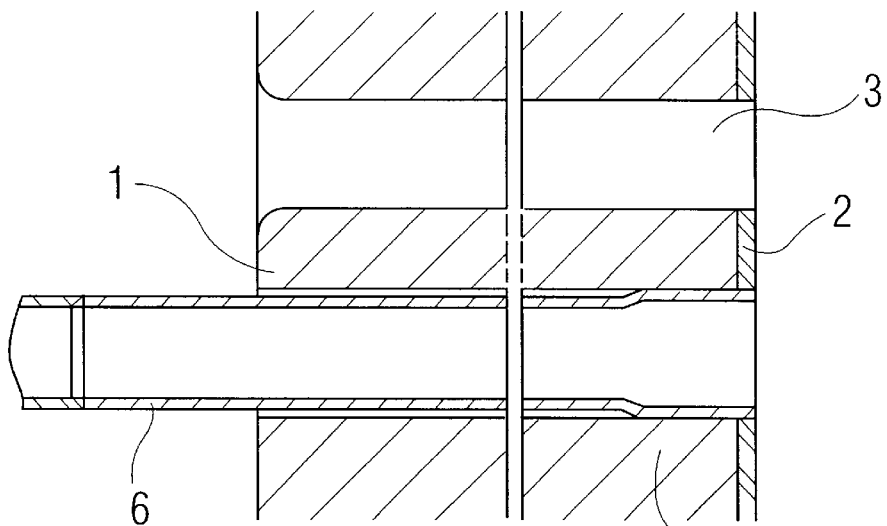
FIG. 5 is a sectional view showing the insertion of a new partial tube section.

After cleaning the hole 3, a new partial tube 6 is introduced corresponding to FIG. 5 through the hole 3 of the tube bottom 1.

Figure 6:
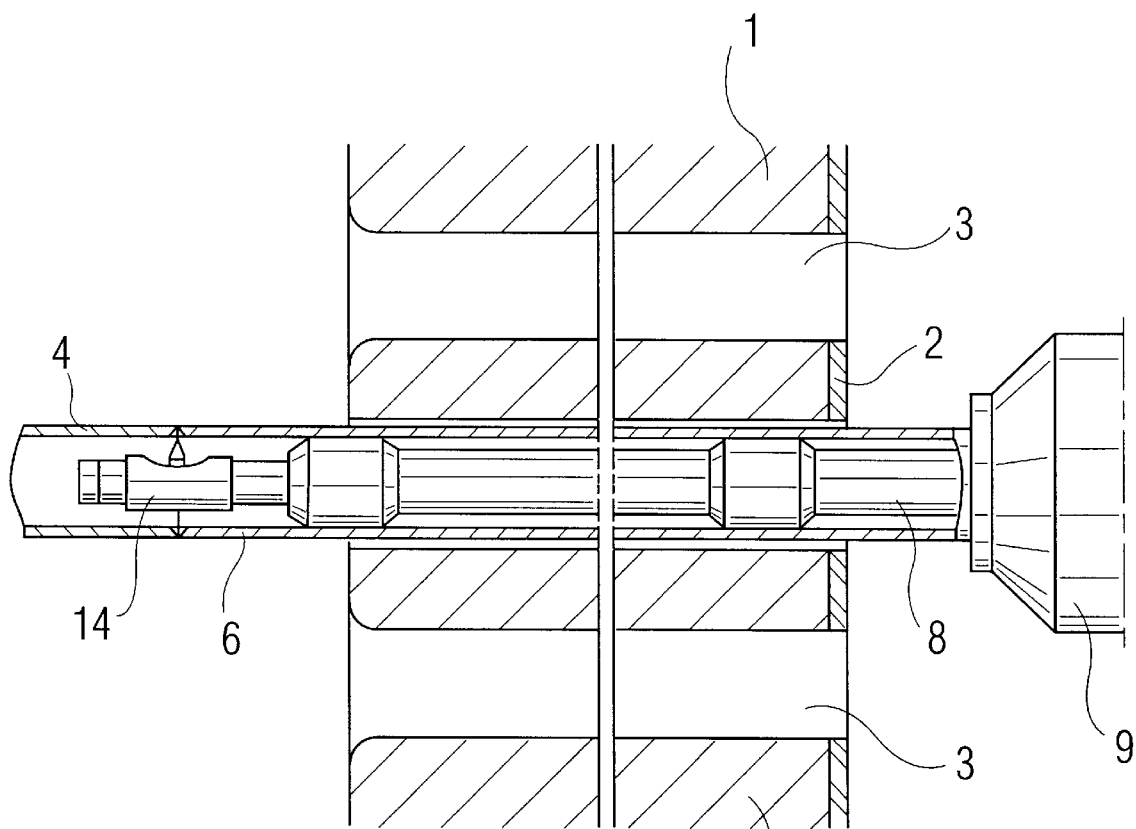
FIG. 6 is a sectional view showing the joining of the partial tube section to the remaining heat exchanger tube.

The joining of the new partial tube 6 to the heat exchanger tube 4 having remained in the inside of the heat exchanger is performed, as is shown in FIG. 6, by inner tube or orbital welding by means of an inner tube welding device 14, which is fastened to a bracket 8 and drive 9 and is introduced through the new partial tube 6.

Figure 7:
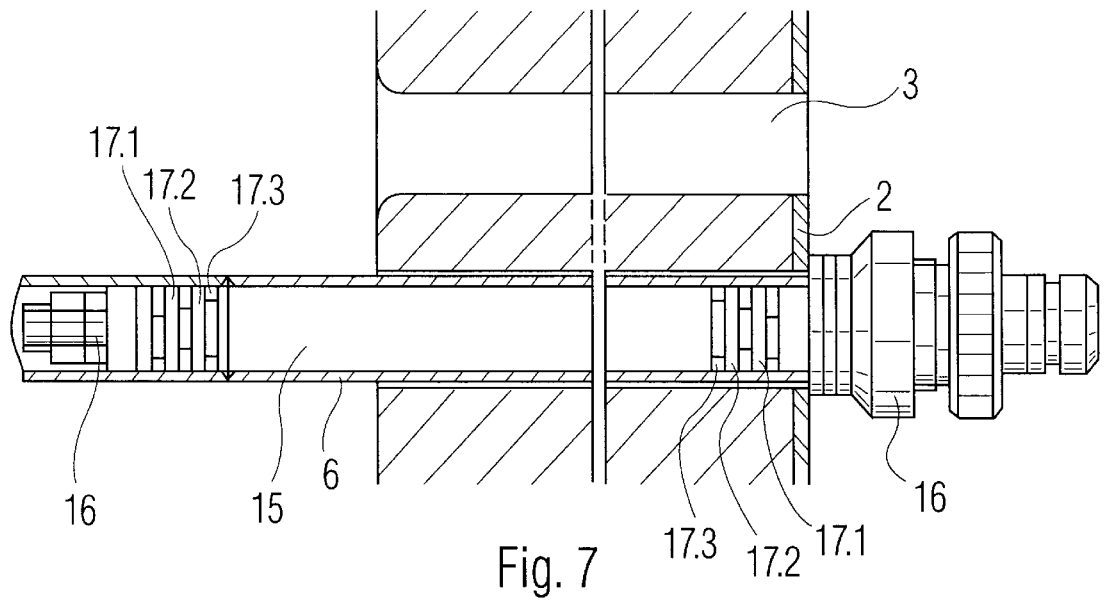
FIG. 7 is a sectional view showing the pressure test.

After welding together the partial tube 6 and the heat exchanger tube 4, a pressure test is performed according to FIG. 7 as the next step to check the tightness and strength of the welded seam. A pressure testing tube 15 with screw plugs 16 on both sides is used for this purpose. Segment rings 17.1, plastic rings 17.2 and O rings 17.3 are arranged on both sides between the screw plugs 16 and the pressure testing tube.

Figure 8:
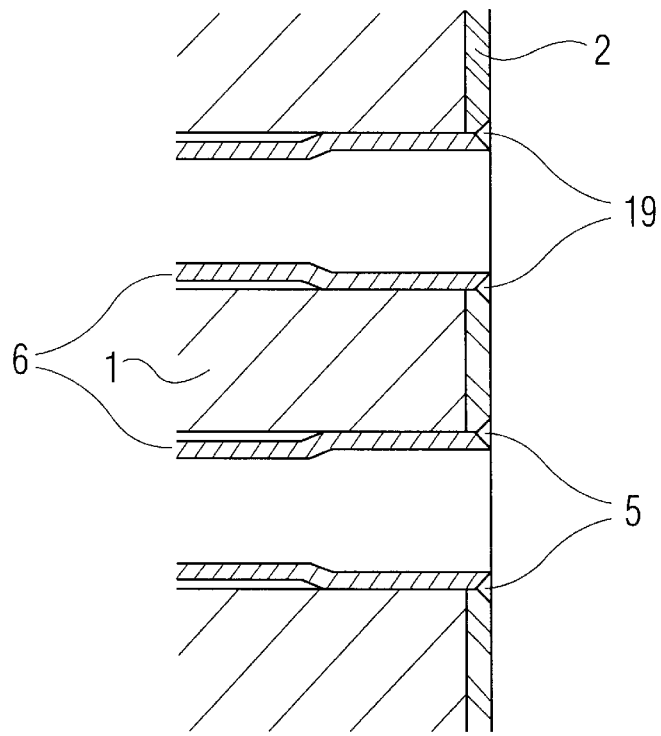
FIG. 8 is a sectional view showing the joining of the new partial tube section to the tube bottom.

FIG. 8 shows the welding of the new partial tube 6 to the plating 2 of the tube bottom. After preparatory operations 19, a welded seam 5 is prepared between the plating 2 and the cut edge of the partial tube 6.

Figure 9:
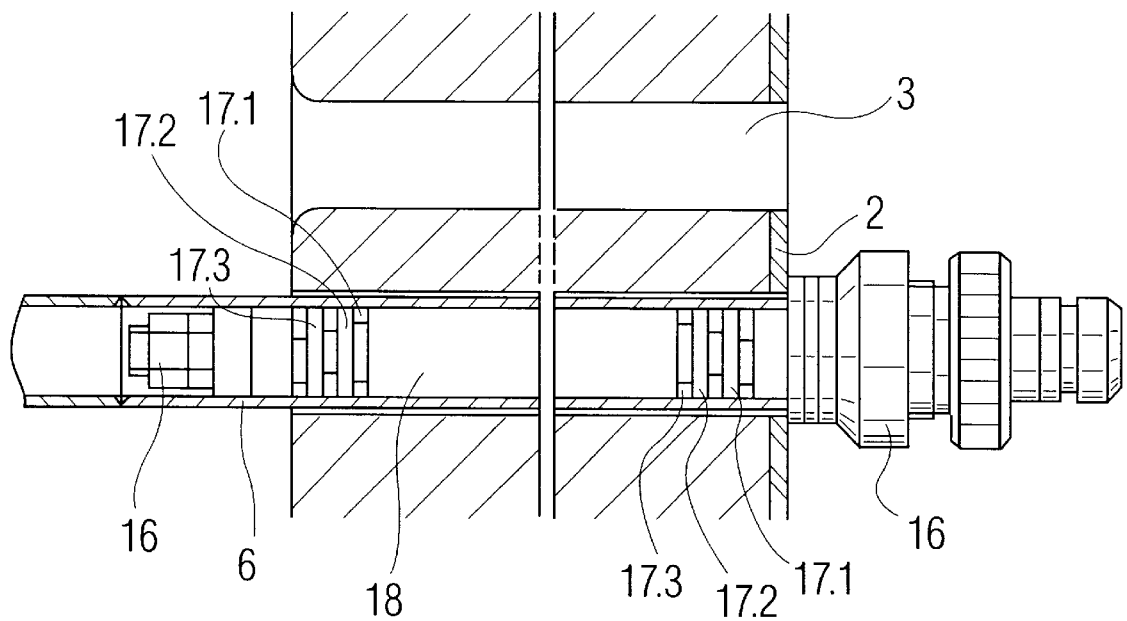
FIG. 9 is a sectional view showing the hydraulic expansion of the partial tube section in the hole of the tube bottom.

Expansion of the welded-in partial tube section 6 in the hole 3 of the tube bottom 1 is performed corresponding to FIG. 9 by means of a hydraulic probe 18, which is provided with screw plugs 16 and sealing rings 17.1–17.3 on both sides.

Figure 10:
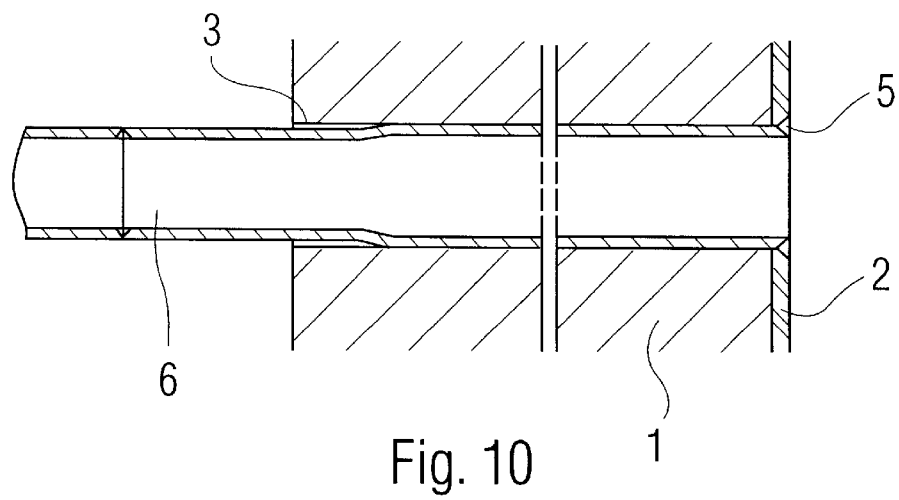
FIG. 10 is a sectional view showing the rolling of the partial tube section onto the hole of the tube bottom.

Finally, FIG. 10 shows the possibility of rolling on the partial tube 6 in the hole 3 of the tube bottom 1 by means of a tool, not shown, after the weld seam 5 has already been prepared on the plating 2.

While specific embodiments of the invention have been shown and described in detail to illustrate the application of the principles of the invention, it will be understood that the invention may be embodied otherwise without departing from such principles.

What is claimed is:

1. A process for repairing heat exchanger tubes from a tube side by partial tube replacement in an inside of a closed tube apparatus with at least one cylindrical tube bottom, the process comprising the steps of:

straightening dents in a tube section by introducing rotating drilling tools through a tube bottom into an inside of said tube section;

separating a partial tube section from a remainder of a tube by means of a rotating cutting tool in the interior of said partial tube section;

removing a connecting weld seam between a tube and the tube bottom by machining said connecting weld seam;

pulling said partial tube section through the tube bottom by means of one of a screw tap and an extracting device, after shrinking of a rolled area;

preparing a centering portion on said tube by means of a rotating milling cutter through the tube bottom;

inserting a new partial tube section through a hole in the tube bottom;

filling a jacket side of the apparatus with forming gas;

joining a new partial tube section to said remainder of said tube by inner tube welding with or without an auxiliary welding rod through the said tube bottom to form a joint;

pressure testing said joint;

one of joining of a new partial tube section to the tube bottom and plating the tube bottom;

hydraulicly expanding said new partial tube section in said hole of the tube bottom; and rolling said new partial tube section onto said hole of said tube bottom.

2. A process for repairing heat exchanger tubes from a tube side by partial tube insertion in an interior of a closed tube apparatus with at least one cylindrical tube bottom, comprising the steps of:

straightening dents in a tube by introducing a rotating drilling tool through the tube bottom;

inserting a new partial tube section of a smaller diameter in a damaged area of said tube;

joining of said new partial tube section of smaller diameter to said tube at both ends of said new partial tube section of smaller diameter by inner tube welding with or without auxiliary welding rod through the tube bottom; and hydraulicly expanding said new partial tube section of smaller diameter in an area of the tube bottom.

3. The process for repairing heat exchanger tubes according to claim 2, further comprising:

rolling on said new partial tube section of smaller diameter in said area of the tube bottom.

4. A process for repairing heat exchanger tubes from a tube side by partial tube replacement in an inside of a closed tube apparatus with at least one cylindrical tube bottom, the process comprising the steps of:

straightening dents in a tube by introducing a rotating drilling tool through a tube bottom into an inside of a tube section;

separating a partial tube section from a remainder of said tube by means of a rotating cutting tool in an interior of said tube section;

removing a connecting weld seam between said tube and the tube bottom by machining said connecting weld seam;

pulling said partial tube section through the tube bottom by means of one of a screw tap and an extracting device, after a shrinking of the partial tube section area;

preparing a centering on said remainder of said tube by means of a rotating milling cutter extending through the tube bottom;

inserting a new partial tube section through a hole in the tube bottom;

filling of a jacket side of the apparatus with forming gas, joining said new partial tube section to said remainder of said tube to form a joint, by inner tube welding with or without an auxiliary welding rod through the tube bottom;

pressure testing of said joint;

one of joining of said new partial tube section to the tube bottom and plating of the tube bottom; and hydraulicly expanding said new partial tube section in said hole of the tube bottom.

5. The process for repairing heat exchanger tubes according to claim 4, comprising: rolling of said new partial tube section onto said hole of the tube bottom.

6. The process for repairing heat exchanger tubes according to claim 2, wherein the weld seam located in the tube is preferably prepared as a fillet weld.

* * * * *